Sept. 5, 1967 D. L. STODDARD 3,339,993

MAGNETIC STRIP STORAGE CELLS

Filed April 4, 1966 2 Sheets-Sheet 1

INVENTOR.
DAVID L. STODDARD

BY Robert B. Crouch
ATTORNEY

Sept. 5, 1967 D. L. STODDARD 3,339,993

MAGNETIC STRIP STORAGE CELLS

Filed April 4, 1966 2 Sheets-Sheet 2

United States Patent Office 3,339,993
Patented Sept. 5, 1967

3,339,993
MAGNETIC STRIP STORAGE CELLS
David L. Stoddard, Los Gatos, Calif., assignor to International Business Machines Corporation, Armonk, N.Y., a corporation of New York
Filed Apr. 4, 1966, Ser. No. 539,808
7 Claims. (Cl. 312—234.1)

The present invention relates to a direct address data storage device which employs magnetic strips as the storage medium and more particularly, to a protective receptacle or cell for supporting a number of magnetic strips in position for ready access by a read/write station.

Large capacity direct address data storage devices which employ a large number of strips of magnetic recording tape have been suggested at various times heretofore. These devices generally have featured an array of strips positioned near a read/write station, some means for accessing a selected strip by the read/write station and a means of effecting relative movement between the selected strip and a magnetic transducer in the read/write station. In order to obtain access to a particular strip in the array, a basic question is presented as to whether the magnetic transducer should be moved to the location of the selected strip or the strip transported to the fixed location of the read/write station. If the latter approach is selected a further question is presented as to whether the entire array should be moved to position the selected strip adjacent the read/write station or the selected strip extracted from the array and it alone transported to the read/write station. Movement of the entire array has the inherent difficulty of inertia involved in accelerating and decelerating a relative large mass, plus the necessity of accepting either the slow access time involved with a linear array of strips or the mechanical difficulties of two dimensional movement of a more compact rectangular array. The approach of extracting a single strip from the array and transporting it to the read/write station involves the inherent difficulties of handling an elongated strip of flexible material plus the necessity of providing some unique identification for each strip, so it can be readily identified and extracted from the array. The problems involved in the various approaches have usually resulted in a compromise such as movement of a large rectangular array along one dimension and subsequent movement of the read/write station along another dimension normal thereto, or restriction of the size of the array and positioning a resultant limited number of strips immediately adjacent the read/write station, so that the problems of strip handling are reduced to a minimum. These compromise approaches have prevented full realization of the advantages of a strip-type storage since the first approach involves a slow access time, thus limiting the amount of information which can be processed in a given length of time, while the second approach results in severe limitation of the overall storage capacity of the device.

To permit realization of the advantages of a magnetic strip storage device, i.e., large data storage capacity combined with moderate access time, it has been proposed to arrange the strips in a cylindrical array which is rotated to position a desired strip beneath a fixed read/write station. This requires that the strips be supported such that they will resist being displaced by the forces generated during rotation of the array and that each strip be immediately accessible after arriving in position below the read/write station, so that it can be withdrawn from the array for a read/write operation and then returned to the array.

The object of the present invention is to provide a removable receptacle or cell for supporting a number of elongated flexible strips of magnetic recording tape in position for ready access by a read/write station when attached to a direct access storage device, and for protecting the strips against contamination or careless handling when the cell is detached from the storage device.

The above object is realized in the present invention by provision of an elongated cell adapted to be removably mounted on the circumference of a generally cylindrical spindle, the front and rear surfaces of the cell being spaced apart by convergent side surfaces which lie on extensions of spaced radii of the spindle. The bottom of the cell is closed while the top is open. A number of elongated flexible strips of magnetic recording tape are positioned longitudinally within the cell with the upper extremities protruding from the open end. The strips are grouped in subcells, each subcell being retained in position with the width of the strips extending radially of the spindle. Means is provided for supporting the upper extremity of each subcell of strips during rotational movement of the spindle, while allowing access to, and extraction of, any desired strip of the subcell by an access mechanism in the read/write station.

The foregoing and other objects, features and advantages of the invention will be apparent from the following more particular description of the preferred embodiment of the invention as illustrated in the accompanying drawings, wherein.

Figure 1:
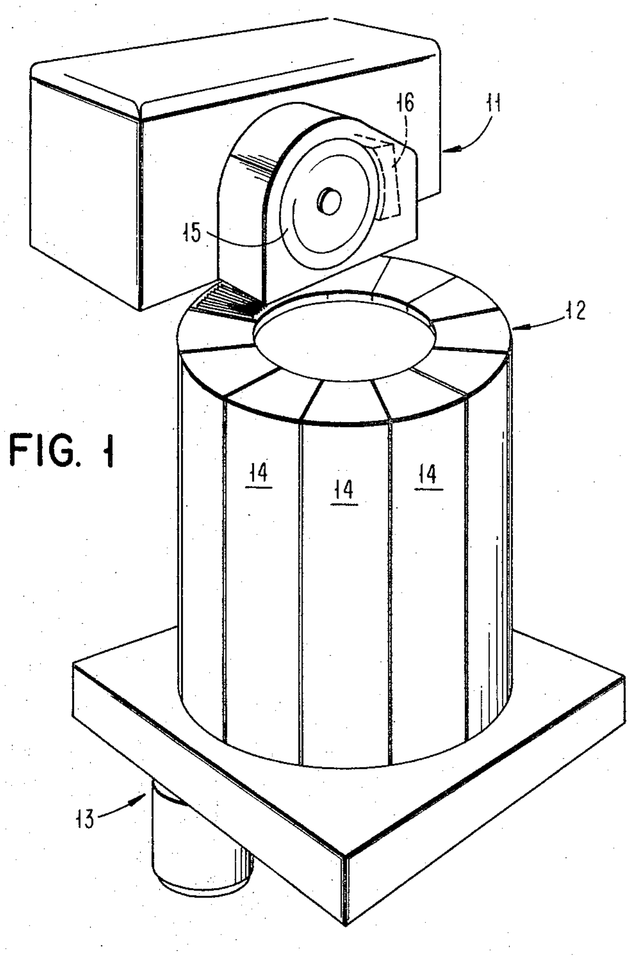
FIG. 1 is a schematic view in perspective showing the overall configuration of a direct address magnetic strip storage device.

Referring to FIG. 1 of the drawing a direct address magnetic strip storage device is illustrated schematically as including a fixed read/write station 11, a cylindrical data storage bin 12 positioned below the read/write station, and a motor and control means 13 for rotating the bin in either direction relative to the read/write station. The read/write station is supported in alignment with and in close proximity to the outer segment of the bin which is made up of a number of elongated cells 14 of strips. The cells are secured to the periphery of a spindle which is mounted for rotation and in driving engagement with the motor. The cells are each open at the upper end to permit access to any of the strips stored therein. When a particular strip is desired, the bin is rotated to position that strip below an opening in the lower surface of the read/write station. The strip is then withdrawn from the cell, wrapped around a cylindrical drum 15 and rotated past a read/write transducer, shown in dotted line at 16, for a read/write operation. When the data transfer operation is completed, the direction of rotation of the drum is reversed and the strip returned to its position within the cell. The bin is then rotated to bring the next desired strip into alignment with the read/write station. A read/write station which is suitable for use with the storage device of FIG. 1 is disclosed in U.S. Patent 3,176,279, issued Mar. 30, 1965, to A. D. Lin et al.

Figure 3:
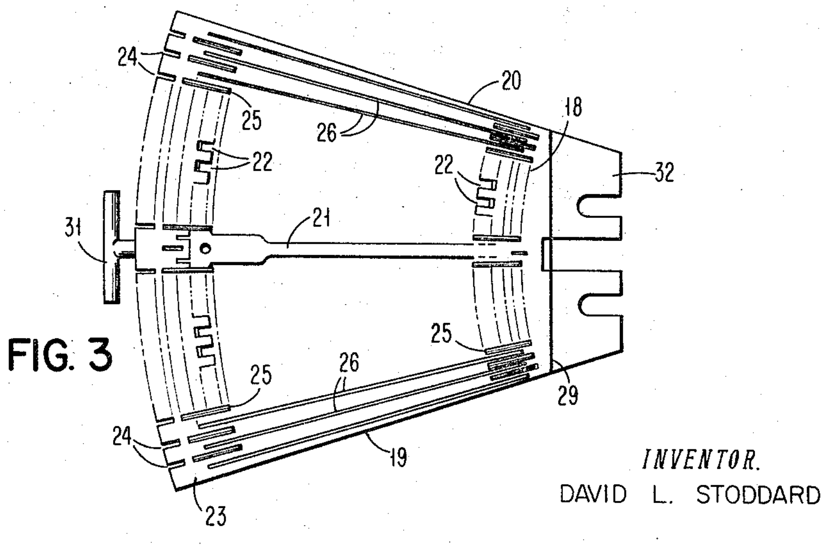
FIG. 3 is a plan view of the cell of FIG. 2.
Figure 2:
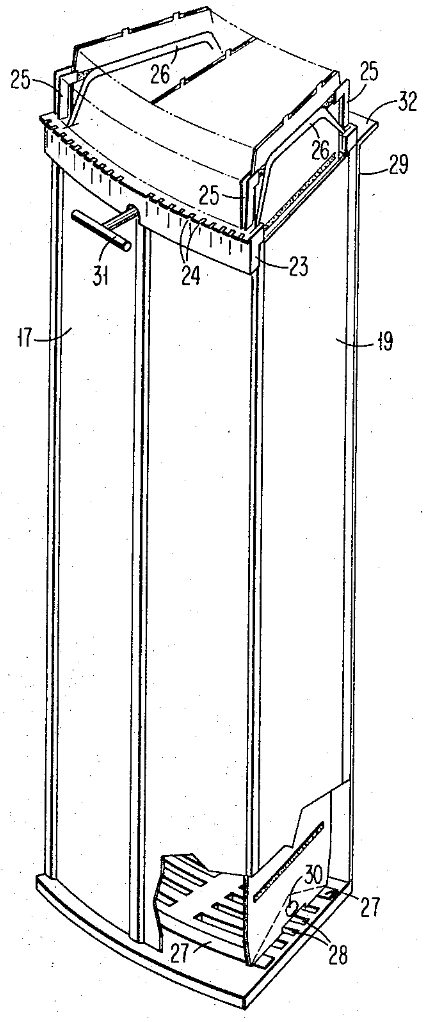
FIG. 2 is a perspective view of a storage cell according to the present invention.

As shown in FIGS. 2 and 3 each cell 14 includes a hollow elongated body section which is made up of generally arcuate front and rear sections 17 and 18 spaced apart by planar side surfaces 19, 20 and an intermediate web member 21. The side surfaces and the web member each lie on a radius of the bin and are spaced approximately 18 degrees apart. The body section is made of a light, strong material which is dimensionally stable, such as magnesium, etc. The interior of the body, FIG. 3, is provided with closely spaced, oppositely directed pairs of longitudinally extending grooves 22 which are broached, or otherwise formed, in the interior surfaces of the front and rear sections. As illustrated the interior of the cell is divided into two equal sized compartments by the intermediate web member 21, and there are ten pairs of grooves 22 in each compartment. Each pair of grooves is located on a radius of the bin. An arcuate mask 23 is attached to the upper edge of the front section 17. The mask is provided with outwardly opening slots 24, each of which is aligned with a pair of the longitudinal grooves 22 formed in the interior of the cell. Pairs of vertically extending subcell springs 25 are mounted on the upper edges of the front and rear sections adjacent each of the grooves 22. The subcell springs are generally L-shaped leaf springs cantilevered by one leg from the front and rear sections. The subcell springs are arranged in pairs, a pair being located in alignment with each longitudinal groove 22 with the free legs thereof extending inwardly of the cells. Flat bridge springs 26 span the open end of the cell between adjacent pairs of grooves 22. The bridge springs are mounted at their extremities on the front and rear sections and extend above the cell and then across the open end of the cell in approximate alignment with the free legs of the subcell springs. A bridge spring is provided between adjacent pairs of longitudinal grooves 22 and at the outboard edge of the outermost pair of grooves. The internal surface of the bottom of the cell is cushioned by means of pads 27 of butyl rubber or similar material. The bottom of the cell is perforated between the pads by slots 28 to allow passage of air. A hardened mounting plate 29 is secured to the rear section of the cell to facilitate securing the cell to the spindle.

The recording strips employed with the cell configuration of the present invention are lengths of magnetic recording tape approximately two inches wide and thirteen inches long. Coding tabs are provided at the upper extremities of the strips while the lower extremities are notched to provide a "swallow tail" cross section. The strips are grouped in subcells, each subcell including ten strips sandwiched between two separator strips. The separator strips, as indicated in FIG. 2, have coding tabs at the upper extremities and are each provided with an opening 30 adjacent the lower extremity. A complete subcell, i.e., ten strips and two separator strips, is inserted in each pair of longitudinal grooves 22 with the lateral edges of the upper ends of the subcell gripped between pairs of subcell springs 25. Metal stiffening stays are bonded to the outer surfaces of the separator strips at intervals and particularly where they contact the subcell and bridge springs. These stays provide rigidity across the subcell and a better wear surface to resist rubbing effects of the subcell and bridge springs. A rod passes through the cell body from one side surface to the other. The rod passes through the openings 30 in the separator strips and the notches in the recording strips. The separator strips are thus retained within the cell by the rod while the recording strips can be extracted and replaced for a read/write operation.

In the operation of the data storage device of FIG. 1 the bin is rotated to align a given subcell with an access mechanism in the read/write station. The slot 24 in the mask 23 which corresponds to the desired subcell can be sensed by suitable means, such as a light and photo cell, to ensure that the subcell is in proper alignment for a strip extraction. The subcell springs gripping the selected subcell are opened, the strips on either side of the selected strip are separated, and the selected strip withdrawn for the data transfer operation. An access mechanism suitable for use with the device of FIG. 1 is disclosed in U.S. Patent 3,126,008, issued Mar. 24, 1964, to J. R. Geddes. When the selected strip is replaced in its original position in the subcell, the lower extremity of the strip contacts the cushioning pads in the bottom of the cell. The pads absorb the energy of the strip motion during this restore operation and prevent the strip from bouncing. This ensures that the strip will be returned to its proper position in the subcell and will not protrude above the adjacent strips. The subcell springs which straddle each subcell above the cell position the upper extremities of the strips in alignment with the access mechanism and prevent excessive strip top vibration when the cell is rotated during movement of the bin. The subcell springs effectively damp the strip top vibration induced by rapid deceleration of the rotating bin. The bridge springs 26 modify the deflection curve of the strips when they are separated by the access mechanism and permit improved control of the selected strips. By modifying the deflection curve of the separated strips the bridge springs distribute the contact between the selected strip and the separated strips and reduce the unsupported length of the selected strip which is to be grasped by the access mechanism.

The cell configuration illustrated is removable from the bin of FIG. 1 and is interchangeable, so that one cell can be removed and replaced with another. To facilitate the cell removal and to protect the magnetic strips a combination handle-cover may be provided. A T-shaped bracket 31 is provided on the front section of the cell to act as a cover attachment and pivot point. A cover (not shown) is engaged with bracket 31 and the radially extending lip 32 on the mounting plate 29 to permit removal and storage of the cell.

While the invention has been particularly shown and described with reference to a preferred embodiment thereof, it will be understood by those skilled in the art that various changes and modifications may be made without departing from the spirit and scope of the invention.

What I claim is:

1. For use with a large capacity data storage device which employs strips of flexible tape as a recording medium,
- an elongated hollow cell having one closed end and one open end, and front and rear sections spaced apart by planar convergent side surfaces,
- the interior of the cell being provided with pairs of closely-spaced oppositely-extending longitudinal grooves formed in the inner surfaces of the front and rear sections, and
- strip restraining means protruding from the upper end of the cell in alignment with the longitudinal grooves.

2. A cell as defined in claim 1 including a subcell of strips received in each pair of longitudinal grooves and supported by the restraining means.

3. A cell as defined in claim 2 which includes
- means mounted on the exterior of the cell having an identifiable indicia aligned with each subcell of strips.

4. A cell as defined in claim 3 which includes
- a layer of energy-absorbent padding attached to the inner surface of the closed ends of the cell.

5. A cell configuration as defined in claim 4 which includes
- flat bridge springs extending across the open end of the cell between adjacent pairs of oppositely extending grooves.

6. A cell as defined in claim 1 in which
- the strip restraining means includes a pair of cantilevered leaf springs disposed adjacent each of said grooves.

7. A cell construction as defined in claim 6 including
- a subcell of strips received in each pair of longitudinal grooves and gripped by the associated leaf springs.

References Cited

UNITED STATES PATENTS

| | | | |
|---|---|---|---|
| 2,722,676 | 11/1955 | Begun | 340—172.5 |
| 3,126,008 | 3/1964 | Geddes | 129—16.1 |
| 3,176,279 | 3/1965 | Lin et al. | 340—174.1 |
| 3,176,281 | 3/1965 | Pattison | 340—174.1 |
| 3,267,939 | 8/1966 | Ford et al. | 129—28 |
| 3,308,451 | 3/1967 | Blackley et al. | 340—174.1 |

CASMIR A. NUNBERG, *Primary Examiner.*